US012563498B2

(12) United States Patent
Cui et al.

(10) Patent No.: US 12,563,498 B2
(45) Date of Patent: Feb. 24, 2026

(54) SYNCHRONIZATION AND RS DESIGN FOR LP-WUR UE

(71) Applicant: Apple Inc., Cupertino, CA (US)

(72) Inventors: Jie Cui, San Jose, CA (US); Yang Tang, San Jose, CA (US); Qiming Li, Beijing (CN); Manasa Raghavan, Sunnyvale, CA (US); Xiang Chen, Campbell, CA (US); Hong He, San Jose, CA (US); Yuexia Song, Beijing (CN); Rolando E. Bettancourt Ortega, Munich (DE); Dawei Zhang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 321 days.

(21) Appl. No.: 18/352,714

(22) Filed: Jul. 14, 2023

(65) Prior Publication Data

US 2024/0049138 A1 Feb. 8, 2024

Related U.S. Application Data

(60) Provisional application No. 63/370,167, filed on Aug. 2, 2022.

(51) Int. Cl.
*H04W 52/02* (2009.01)
*H04W 68/02* (2009.01)

(52) U.S. Cl.
CPC ....... *H04W 52/0235* (2013.01); *H04W 68/02* (2013.01)

(58) Field of Classification Search
CPC .......................... H04W 52/0235; H04W 68/02

USPC .......................................................... 370/318
See application file for complete search history.

(56) References Cited

U.S. PATENT DOCUMENTS

| | | | | |
|---|---|---|---|---|
| 12,028,805 | B2* | 7/2024 | Ly ..................... | H04W 52/0235 |
| 2014/0112225 | A1* | 4/2014 | Jafarian ........... | H04W 52/0235 |
| | | | | 370/311 |
| 2018/0317172 | A1* | 11/2018 | Lepp ................ | H04W 52/0212 |
| 2021/0076329 | A1* | 3/2021 | Kasslin ............... | H04W 76/28 |
| 2021/0185611 | A1* | 6/2021 | Ljung .............. | H04W 52/0216 |

(Continued)

FOREIGN PATENT DOCUMENTS

WO WO 2021162623 A1 8/2021

OTHER PUBLICATIONS

International Search Report and Written Opinion directed to related International Application No. PCT/US2023/071228, mailed Nov. 20, 2023; 11 pages.

(Continued)

*Primary Examiner* — Mark G. Pannell
(74) *Attorney, Agent, or Firm* — Sterne, Kessler, Goldstein & Fox, P.L.L.C.

(57) ABSTRACT

Aspects are described for a user equipment (UE) comprising a low power wake up radio (LP-WUR) and a main radio configured to enable wireless communications with a base station, and a processor communicatively coupled to the LP-WUR and the main radio. The processor is configured to receive a first low power wake up signal (LP-WUS) from the base station; determine that the first LP-WUS corresponds to a cell of the UE; and determine that the first LP-WUS indicates powering on the main radio. The processor is further configured to turn on the main radio and receive a paging message from the base station.

19 Claims, 6 Drawing Sheets

(56) References Cited

U.S. PATENT DOCUMENTS

| | | | | |
|---|---|---|---|---|
| 2022/0046744 | A1* | 2/2022 | Bao | H04W 72/23 |
| 2023/0063026 | A1* | 3/2023 | Reial | H04W 52/0235 |
| 2023/0269666 | A1* | 8/2023 | Wu | H04W 52/0235 |
| | | | | 370/311 |
| 2023/0345377 | A1* | 10/2023 | Liao | H04W 52/028 |
| 2023/0397116 | A1* | 12/2023 | Maleki | H04W 52/0216 |
| 2024/0007950 | A1* | 1/2024 | Liao | H04W 52/0212 |
| 2024/0276449 | A1* | 8/2024 | Mu | H04W 68/025 |
| 2024/0340798 | A1* | 10/2024 | Li | H04W 52/0216 |
| 2024/0397422 | A1* | 11/2024 | Martin | H04W 52/0235 |
| 2025/0024374 | A1* | 1/2025 | Höglund | H04W 52/0219 |
| 2025/0024376 | A1* | 1/2025 | Feng | H04L 5/0094 |
| 2025/0220582 | A1* | 7/2025 | Li | H04W 68/02 |

OTHER PUBLICATIONS

3GPP TS 38.133 V17.6.0 (Jun. 2022), 3rd Generation Partnership Project; Technical Specification Group Radio Access Network; NR; Requirements for support of radio resource management (Release 17); 3637 pages.
Vivo, "New SID: Study on low-power Wake-up Signal and Receiver for NR," 3GPP TSG RAN meeting #94e, Electronic Meeting, Dec. 6-17, 2021, RP-213645 (revision of RP-213593); 4 pages.

* cited by examiner

500

502

Generate a LP-WUS

504

Transmit the LP-WUS to a UE

506

Transmit Signals to the Main Radio of the UE

508

Receive Signals from the Main Radio of the UE

SYNCHRONIZATION AND RS DESIGN FOR LP-WUR UE

CROSS REFERENCES

This application claims the benefit of U.S. Provisional Application No. 63/370,167 filed Aug. 2, 2022, titled "Synchronization and RS design for LP-WUR UE," the content of which is herein incorporated by reference in its entirety.

BACKGROUND

Field

The described aspects generally relate to a low-power wake-up radio (LP-WUR) design.

SUMMARY

Some aspects of this disclosure relate to systems, apparatuses, and methods for implementing an LP-WUR in a user equipment (UE). For example, the systems, the apparatuses, and the methods are provided for implementing the LP-WUR to wake-up or turn off a main radio of the UE.

Some aspects of this disclosure relate to a UE comprising a LP-WUR and a main radio configured to enable wireless communications with a base station, and a processor communicatively coupled to the LP-WUR and the main radio. The processor is configured to receive a first low power wake up signal (LP-WUS) from the base station; determine that the first LP-WUS corresponds to a cell of the UE; and determine that the first LP-WUS indicates powering on the main radio. The processor is further configured to turn on the main radio and receive a paging message from the base station.

Some aspects of this disclosure relate to a method of operating a UE. The method comprises receiving a first LP-WUS from a base station; determining that the first LP-WUS corresponds to a cell of the UE; and determining that the first LP-WUS indicates powering on a main radio of the UE. The method further comprises turning on the main radio and receiving a paging message from the base station.

Some aspects of this disclosure relate to a non-transitory computer-readable medium (CRM) comprising instructions to, upon execution of the instructions by one or more processors of a UE, cause the UE to perform operations. The operations comprise receiving a first LP-WUS from a base station; determining that the first LP-WUS corresponds to a cell of the UE; and determining that the first LP-WUS indicates powering on a main radio of the UE. The operations further comprise turning on the main radio and receiving a paging message from the base station.

This Summary is provided merely for the purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
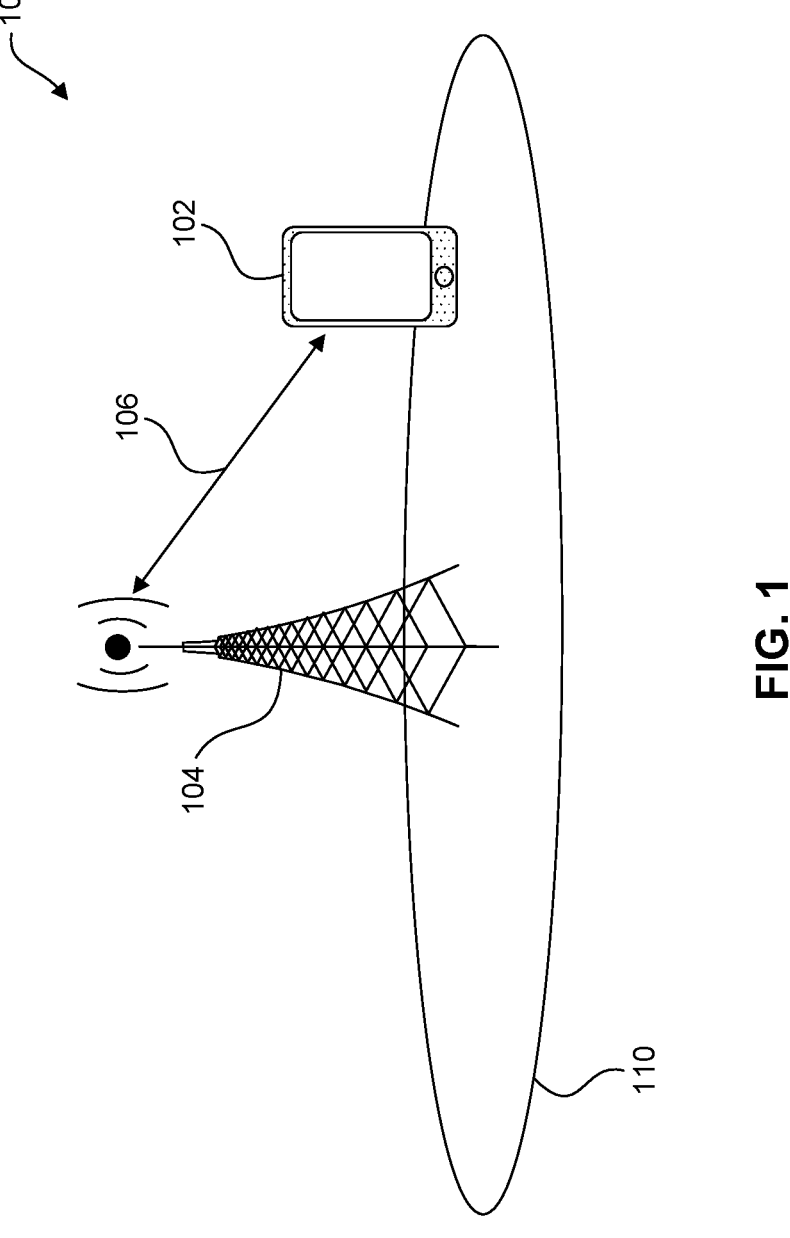
FIG. 1 illustrates an example system implementing an LP-WUR in a UE, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing an LP-WUR in a UE. For example, the systems, the apparatuses, and the methods are provided for implementing the LP-WUR to wake up or turn off a main radio of the UE.

In some aspects, a UE can enter one or more low-power modes (also referred to as sleep modes) to reduce power consumption. For example, the UE can enter a radio resource control (RRC) idle mode and refrain from transmitting and receiving signals. The UE can also enter an RRC inactive mode and reduce communications to and from the base station. In both cases, the UE can turn off or turn down a main radio of the UE to reduce the power consumption. In some aspects, the UE wakes up periodically in a low-power mode to receive and/or transmit signals. For example, in the RRC idle mode, the UE can wake up periodically to detect paging signals from the base station. In the RRC inactive mode, the UE can wake up to perform small data transmission and/or early measurements of neighboring cells. In some aspects, the power consumption of the UE when waking up is much larger than that of the UE when sleeping. In addition, some wake-up periods may be unnecessary. For example, the UE may wake up in the RRC idle mode but no paging signal is transmitted by the base station. For another example, the UE may wake up in the RRC inactive mode, but there is no data to be transmitted or received using the small data transmission. Therefore, it is beneficial to avoid waking up the UE if not necessary.

In some aspects, in addition to the main radio, the UE also includes an LP-WUR. The LP-WUR may have limited capabilities and thus consume much less power compared with the main radio. For example, the LP-WUR can operate on simple modulation schemes such as an on-off keying (OOK) modulation or a low level amplitude shift keying (ASK) modulation. The LP-WUR may include a receiver, but no transmitter and thus not be able to transmit. The LP-WUR may also have a low data rate. Therefore, the UE can be considered to be sleeping in a low power mode or a sleep mode when the main radio is turned off but the LP-WUR is on. In some aspects, the LP-WUR can control the main radio by turning on or turning off the main radio. For example, the LP-WUR can receive a wake-up signal from the base station and wakes up the main radio. The main radio can receive paging signals or perform small data transmission when waking up. In some aspects, the base station transmits the wake-up signal when subsequent actions are expected. For example, the base station can transmit the wake-up signal shortly before transmitting the paging signals to the UE. Otherwise, the base station does not transmit the wake-up signal if no paging signal is to be transmitted to the UE. In such a case, the UE avoids waking up when there is no paging signal to be received.

In some aspects, the LP-WUR of the UE is configured to detect wake-up signals from the base station. For example, the UE needs to know a time location and a frequency band/frequency point to receive a wake-up signal. Furthermore, the base station may transmit a signal to turn off the main radio of the UE instead of waking up the main radio. The LP-WUR is configured to distinguish wake-up signals and turning-off signals received from the base station.

FIG. 1 illustrates an example system 100 implementing an LP-WUR in a UE, according to some aspects of the disclosure. The example system 100 is provided for the purpose of illustration only and does not limit the disclosed aspects. The example system 100 may include, but is not limited to, a UE 102 and a base station 104. The UE 102 may be implemented as electronic devices configured to operate based on a wide variety of wireless communication techniques. These techniques may include, but are not limited to, techniques based on 3rd Generation Partnership Project (3GPP) standards. For example, the UE 102 can be configured to operate using one or more 3GPP releases, such as Release 15 (Rel-15), Release 16 (Rel-16), Release 17 (Rel-17), or other 3GPP releases. The UE 102 may include, but is not limited to, wireless communication devices, smartphones, laptops, desktops, tablets, personal assistants, monitors, televisions, wearable devices, Internet of Things (IoT) devices, vehicle communication devices, and the like. The base station 104 may include one or more nodes configured to operate based on a wide variety of wireless communication techniques such as, but not limited to, techniques based on the 3GPP standards. For example, the base station 104 may include nodes configured to operate using Rel-15, Rel-16, Rel-17, or other 3GPP releases. The base station 104 may include, but not limited to, NodeBs, eNodeBs, gNBs, new radio base stations (NR BSs), access points (APs), remote radio heads, relay stations, and others.

In some aspects, the UE 102 connects with the base station 104 via a communication link 106. The communication link 106 can include uplink (UL) connections and downlink (DL) connections. As discussed above, the UE 102 can include a main radio and an LP-WUR. The UE 102 can receive, by the main radio via the communication link 106, legacy reference signals (RSs) from the base station 104. The legacy RSs can include synchronization signal block (SSB) signals, a primary synchronization signal (PSS), a secondary synchronization signal (SSS), physical broadcast channel (PBCH) signals, demodulation reference signal (DMRS), system information (SI) signals, and/or other reference signals. The UE can also perform data transmissions, using the main radio and via the communication link 106, to the base station 104. The UE 102 can also receive, using the LP-WUR, a low power wake up signal (LP-WUS) from the base station 104. The UE 102 can receive the LP-WUS via the communication link 106 or a second communication link that is different from the communication link 106. For example, the communication link 106 and the second communication link can have different frequency bands, modulation schemes, time locations, or other configurations.

In some aspects, the UE 102 can connect with the base station 104 via a cell 110. For example, the cell 110 can be a primary cell of the UE 102 supported by the base station 104. In some aspects, the UE 102 can enter an RRC idle mode. In such a case, the UE still camps on the cell 110, but enters a sleep mode and wakes up periodically. In the sleep mode, the UE refrains from transmitting to or receiving from the base station. In other aspects, in the RRC idle mode, the UE 102 stays in the sleep mode until the LP-WUS wakes up the UE. For example, the LP-WUR of the UE monitors the communication link 106 and detects a LP-WUS transmitted by the base station 104. The UE then determines that the LP-WUS indicates turning on the main radio of the UE. The LP-WUS subsequently turns the main radio on. In some aspects, the base station 104 can transmit a paging signal to the UE 102 after transmitting the LP-WUS. In such a case, the UE avoids turning on the main radio when no paging signal is to be received and thus reduces power consumption. In some aspects, the LP-WUS can be a power control reference signal can indicate either turning on or turning off/down the main radio of the UE.

In some aspects, the UE 102 can enter an RRC inactive mode. In the RRC inactive mode, the UE can perform an early measurement for the cell 110 and other secondary cells. When the UE later enters an RRC connected mode, the results of the early measurement can be used to reconfigure connections to the cell 110 and other secondary cells. In some aspects, the UE 102 repeatedly or continuously performs the early measurement. However, the results of the early measurements may expire over time. For example, channel conditions of the cell 110 and/or other secondary cells may have changed. For another example, the UE 102 may have moved to a different location and may need to perform a cell reselection and/or reconfigurations on the secondary cells. Therefore, continuously performing the early measurements may consume more energy than necessary. In some aspects, the UE 102 can be configured to perform the early measurements shortly before entering the RRC connected mode. For example, the UE 102 can turn on the main radio and perform the early measurement after receiving the LP-WUS.

Figure 2:
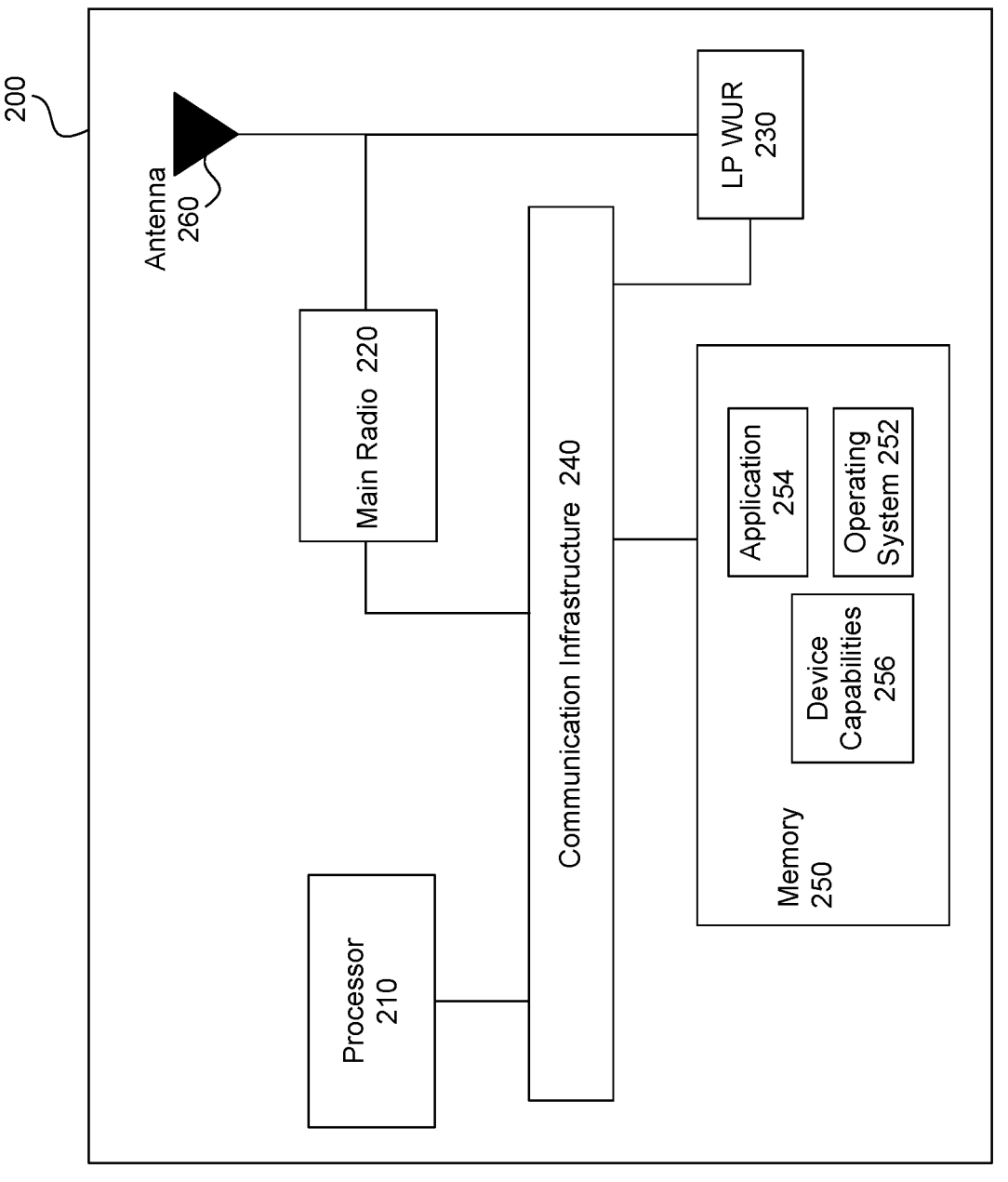
FIG. 2 illustrates a block diagram of an example system of an electronic device for the LP-WUR implementation, according to some aspects of the disclosure.

FIG. 2 illustrates a block diagram of an electronic device 200 implementing the cell measurements and reporting, according to some aspects of the disclosure. The electronic device 200 may be any of the electronic devices (e.g., the UE 102) of the system 100. The electronic device 200 includes a processor 210, a main radio 220, a LP-WUR 230, a communication infrastructure 240, a memory 250, an operating system 252, an application 254, device capabilities 256, and antennas 260. Illustrated systems are provided as exemplary parts of electronic device 200, and electronic device 200 may include other circuit(s) and subsystem(s). Also, although the systems of electronic device 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the main radio 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The applications in the application 254 may include applications such as, but not limited to, radio streaming, video streaming, remote control, and/or other user applications. In some aspects, the device capabilities 256 may be stored in the memory 250.

The electronic device 200 may also include the communication infrastructure 240. The communication infrastructure 240 provides communication between, for example, the processor 210, the main radio 220, the LP-WUR 230, and the memory 250. In some implementations, the communication infrastructure 240 may be a bus.

The processor 210, alone, or together with instructions stored in the memory 250 performs operations enabling electronic device 200 of the system 100 to implement the LP-WUR 230, as described herein. Alternatively, or additionally, the processor 210 can be "hard coded" to implement the LP-WUR 230, as described herein.

The main radio 220 transmit and receive communications signals include legacy RSs and other data communication signals. Additionally, the main radio 220 transmit and receive communications signals that support mechanisms for measuring communication link(s), generating and transmitting system information, and receiving the system information. According to some aspects, the main radio 220 may be coupled to the antennas 260 to wirelessly transmit and receive the communication signals. The antennas 260 may include one or more antennas that may be the same or different types and can form one or more antenna ports. The main radio 220 allow electronic device 200 to communicate with other devices that may be wired and/or wireless. In some examples, the main radio 220 may include processors, controllers, radios, sockets, plugs, buffers, and like circuits/devices used for connecting to and communication on networks. According to some examples, the main radio 220 include one or more circuits to connect to and communicate on wired and/or wireless networks.

Additionally, the main radio 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the main radio 220 may be configured to operate according to one or more of Rel-15, Rel-16, Rel-17, or other releases of 3GPP standard.

Similarly, the LP-WUR 230 may include one or more circuits (including a cellular receiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the LP-WUR 230 may be configured to operate according to one or more of Rel-15, Rel-16, Rel-17, or other releases of 3GPP standard.

In some aspects, the electronic device 200 can enter a power-saving mode or a sleep mode by turning off the main radio 220. For example, the electronic device 200 can refrain from transmitting or receiving using the main radio 220. In some aspects, the electronic device 200 can power down the main radio 220. For example, the main radio 220 can be powered down to consume a small portion of power, such as 1% of the power consumption before powering down. In such a case, the main radio 220 can be considered to be powered off. The main radio 220 can also be turned on or powered on to receive signals from the base station. In addition, the main radio 220 can be turned on to receive paging signals from the base station in the power-saving mode.

In some aspects, the main radio 220 is turned on and turned off based on the LP-WUR 230. For example, the LP-WUR 230 can be coupled to the antennas 260 and receive a turn-off signal from the base station. The LP-WUR 230 can pass a turn-off configuration message or command to the processor 210 via the communication infrastructure 240. The processor 210 then powers off or powers down the main radio 220. The LP-WUR 230 can also pass the turn-off configuration message or command to the main radio 220 to power off or power down the main radio 220. Alternatively, the LP-WUR 230 can receive a wake-up signal, such as an LP-WUS, to power on the main radio 220. The LP-WUR can pass the wake-up signal to the processor 210 and/or the main radio 220 to turn on the main radio 220.

In some aspects, the main radio 220 can receive paging signals from the base station to enter an RRC connected mode. The main radio 220 can also perform small data transmission with the base station and/or early measurements to monitor channel qualities of neighboring cells. The LP-WUR 230 can be a receiver that receives signals, such as the wake-up signal and the turn-off signal, from the base station. In some aspects, the LP-WUR 230 is not capable of transmitting signals.

As discussed in more detail below with respect to FIGS. 3-6, processor 210 may implement different mechanisms for the cell measurements and reporting as discussed with respect to the system 100 of FIG. 1.

Figure 3:
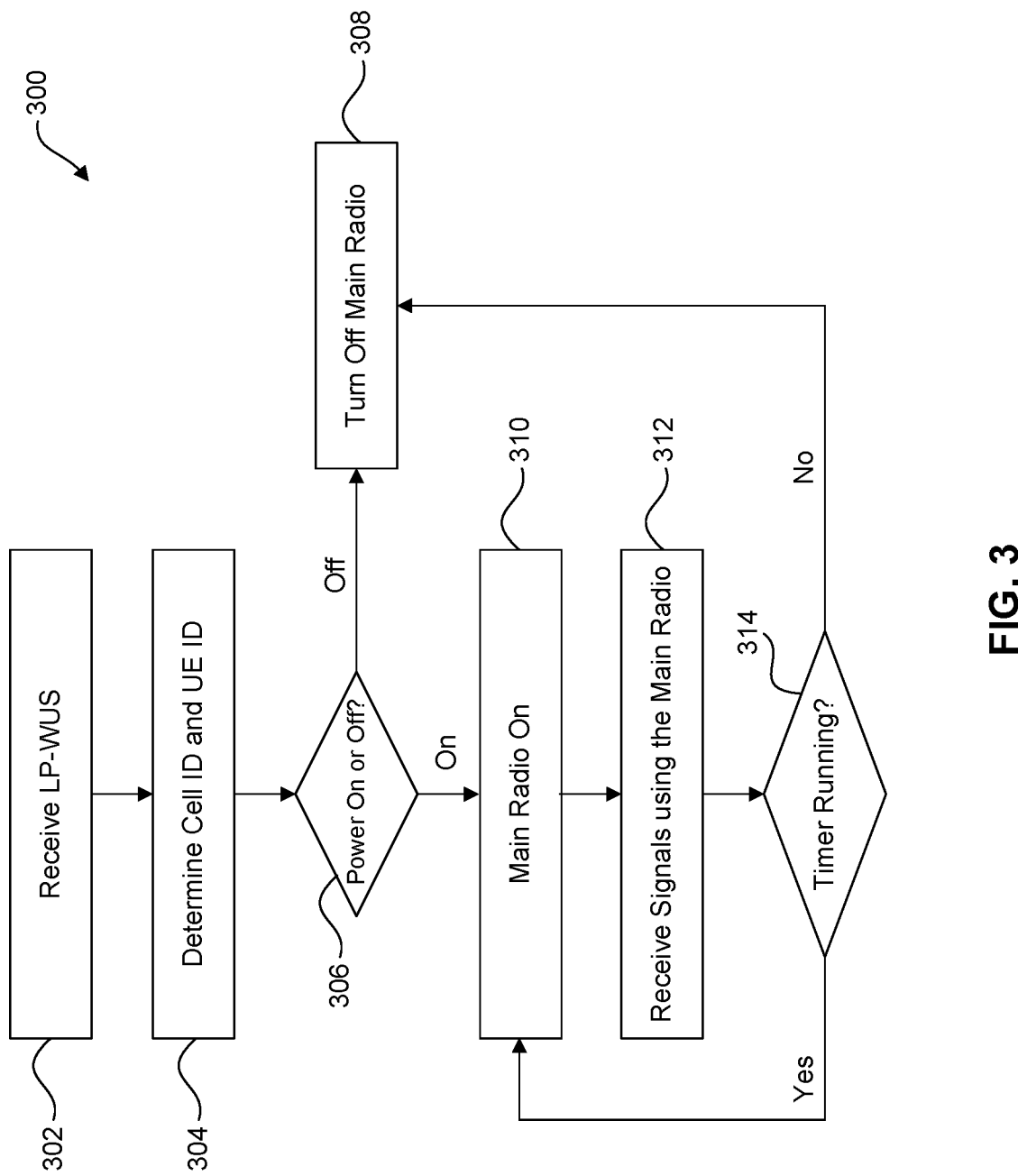
FIG. 3 illustrates an example method of controlling a main radio of the UE using the LP-WUR, according to aspects of the disclosure.

FIG. 3 illustrates an example method 300 of controlling a main radio of the UE using the LP-WUR. The example method 300 is provided for the purpose of illustration only and does not limit the disclosed aspects. As a convenience and not a limitation, FIG. 3 may be described with regard to elements of FIGS. 1, 2, and 6. The example method 300 may represent the operation of electronic devices (for example, the UE 102 and the base station 104 of FIG. 1) implementing the LP-WUR. The example method 300 may also be performed by the electronic device 200 of FIG. 2, controlled or implemented by processor 210, and/or computer system 600 of FIG. 6. But the example method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, the UE, such as the UE 102, receives a main radio control signal, such as an LP-WUS, from a base station, such as the base station 104. In some aspects, the UE receives the LP-WUS using the LP-WUR of the UE. The UE also determines a time location and a frequency band/frequency point to receive the LP-WUS. In other words, the UE may determine one or more resource elements (REs) to be used by the LP-WUS. The frequency band/frequency point of the LP-WUS can be a same or a different frequency band/ frequency point of legacy RSs, which are received via a main radio of the UE. The LP-WUS can be a wake-up signal or a turn-off signal as discussed above.

At 304, the UE determines whether the LP-WUS is directed to the UE. The UE can determine a cell ID and determine whether the cell ID corresponds to a cell that the UE connects to or camps on. In some aspects, the UE can determine the cell ID in three approaches. First, the LP-WUS can be generated by scrambling a cell ID with a scrambling sequence on the base station side. In other words, the base station indicates the cell that the LP-WUS is directed to by scrambling the cell ID of that cell into the LP-WUS using the scrambling sequence. The scrambling sequence is known by both the base station and the UE. For example, the scrambling sequence can be transmitted to the UE from the base station beforehand. The base station can transmit the scrambling sequence to the UE via a higher layer signaling, such as an RRC message. Thus, on the UE side, the UE can generate a local sequence using the scrambling sequence received from the base station and a cell ID of the cell of the UE, for which the UE also has predetermined knowledge. In such a case, the UE can determine whether the local sequence matches the LP-WUS. The UE can calculate a correlation value between the LP-WUS and the local sequence. If the correlation value is higher than a threshold value, the UE determines that the cell ID of the LP-WUS matches the cell ID of the cell that the UE is camped on, and that the LP-WUS is directed to the cell of the UE. Second, the frequency band or frequency point of the LP-WUS can be cell-specific. For example, the base station can assign frequency bands/frequency points to different cells. If the UE receives an LP-WUS in a frequency band/frequency point corresponding to the cell that the UE is camped on, then the LP-WUS inherently corresponds to a cell ID of that cell. Third, the LP-WUS can include a payload that includes a cell ID. The LP-WUS can decode the LP-WUS and extract the payload to identify the cell ID. In some aspects, the cell ID of the UE can also include a physical cell ID (PCI) of the UE.

In some aspects, the UE can also determine a UE ID of the LP-WUS and determine whether it matches a UE ID of the UE. Similar to the cell ID, the UE can determine the UE ID in three approaches. First, the LP-WUS can be generated by scrambling a UE ID with the scrambling sequence on the base station side. On the UE side, the UE can generate the local sequence using the scrambling sequence and the UE ID of the UE. The UE then calculates the correlation value between the LP-WUS and the local sequence to determine whether the UE ID of the LP-WUS matches the UE ID of the UE. In some aspects, the LP-WUS can be generated by scrambling both the UE ID and the cell ID with the scrambling sequence. In such a case, the UE generates the local sequence using both the UE ID of the UE and the cell ID of the cell of the UE. If the correlation value between the LP-WUS and the local sequence is higher than the threshold value, the UE determines that both the cell ID and the UE ID of the LP-WUS match the cell ID and UE ID of the UE, respectively. Second, the frequency band/frequency point of the LP-WUS can be UE-specific. For example, each UE can be assigned a frequency band/frequency point. Therefore, if the UE receives the LP-WUS in the assigned frequency band/frequency point, the LP-WUS corresponds to the UE ID of the UE. Third, the LP-WUS can include the payload that includes the UE ID.

In some aspects, the UE is configured by the base station as which approach to use for determining the cell ID and/or the UE ID. For example, the RRC message received by the UE can indicate the approach for determining the cell ID and/or the UE ID. Using any of the three approaches, if the UE determines that the cell ID and/or the UE ID of the LP-WUS correspond to the cell ID and the UE ID of the UE, the control moves to 306. Otherwise, the UE discards the LP-WUS.

At 306, the UE determines whether the LP-WUS indicates powering on or powering off/down the main radio. As discussed above, the LP-WUS can indicate: (1) turning off or turning down the power of the main radio; and (2) turning on the main radio. The UE can make such a determination via at least four approaches.

First, the LP-WUS can be generated using one of two scrambling sequences: "ON" sequence and "OFF" sequence. If the base station would like to turn on the main radio of the UE, the base station can generate the LP-WUS using the "ON" sequence. Otherwise, the base station can generate the LP-WUS using the "OFF" sequence. On the UE side, the UE is configured with the two scrambling sequences via the higher layer signaling similarly as discussed above. Therefore, the UE can generate two local sequences using the "ON" and "OFF" sequences respectively. Then, the UE can calculate correlation values between the two local sequences and the LP-WUS receives. If the correlation value between the "ON" local sequence and the LP-WUS is higher than the threshold value, the UE determines that the LP-WUS indicates turning on the main radio. Otherwise, the UE determines that the LP-WUS indicates turning off the main radio.

Referring back to 304, if two scrambling sequences, such as the "ON" and "OFF" scrambling sequences, are used to generate the LP-WUS, the UE determines the cell ID and/or the UE ID at 304 based on two local sequences. For example, the UE can generate a first local sequence using the UE ID of the UE and the "ON" scrambling sequence and generate a second local sequence using the UE ID of the UE and the "OFF" scrambling sequence. When determining the UE ID of the LP-WUS, the UE calculates correlation values using both the first and the second local sequences respectively. If one of the two local sequences yields a correlation value higher than the threshold value, the UE determines that the UE ID of the LP-WUS matches the UE ID of the UE.

Second, the UE can determine to power off or power on the main radio based on a power level of the LP-WUS. In some aspects, if the power level of the LP-WUS is higher than a power threshold, the UE determines that the LP-WUS indicates powering off or powering down the main radio of the UE. Otherwise, the UE determines that the LP-WUS indicates powering on the main radio of the UE. In other aspects, if the power level of the LP-WUS is lower than the power threshold, the UE determines that the LP-WUS indicates powering off or powering down the main radio of the UE. Otherwise, the UE determines that the LP-WUS indicates powering on the main radio of the UE.

In both cases, the UE needs to determine the power threshold. In some aspects, the UE determines the power threshold based on an initial power threshold as transmitted by the base station. For example, if the base station is configured to turn off or turn down the main radio of the UE, the base station transmits the LP-WUS with a power level that is higher than the initial power threshold X. Otherwise, the base station transmits the LP-WUS with a power level that is lower than the initial power threshold X. However, the LP-WUS may experience pathloss effects and/or other signal degradation effects when transmitted from the base station to the UE. Therefore, the LP-WUS transmitted with a power level higher than the threshold X can have a power level lower than the threshold X when received by the UE. The UE needs to consider this when determining the power threshold. For example, the UE may locate at the cell edge. The UE can determine a power level difference between the power level of the received LP-WUS at the UE and the power level of the transmitted LP-WUS at the base station to be Y, where Y is a positive value. In such a case, the UE adjusts the initial power threshold X by Y and determines that the power threshold to be X-Y. For another example, if the UE locates at the cell center, the power level of the transmitted LP-WUS at the base station is similar to the power level of the received LP-WUS at the UE because the UE locates close to the base station and the pathloss effect and other signal degradation effects are small. Therefore, Y is close to zero and the UE determines that the power threshold to be X. In this way, the UE can determine Y based on a location of the UE in the cell and then determine the corresponding power threshold X-Y.

In some aspects, the initial threshold X can be based on the power level of the received LP-WUS in a location other than the cell center. For example, the UE may locate in a mid-cell point, i.e., a midpoint between the cell center and a cell edge. In some aspects, the mid-cell point can be any points between the cell center and a cell edge. The base station can consider the pathloss effect and other signal degradation effects between the base station and the UE when transmitting the LP-WUS. For example, if the base station is configured to turn off or turn down the main radio of the UE, the base station transmits the LP-WUS with a power level so that the UE receives the LP-WUS with a power level that is higher than X. Therefore, the UE located in the mid-cell point determines to turn off the main radio if the received LP-WUS has a power level higher than X. The UE located in the mid-cell point determines to turn on the main radio if the received LP-WUS has a power level lower than X. Thus, the threshold power of the UE located in the mid-cell point is the initial threshold X. In some aspects, the UE can move to a different location in the cell and/or a second UE can locate in a location different from the mid-cell point. For the UE or the second UE that do not locate in the mid-cell point, the UE or the second UE can determine the threshold power based on the initial threshold X. For example, if the UE moves closer to the base station to a new location, the power level of the received LP-WUS becomes stronger because less pathloss effects and signal degradation effects are expected. In such a case, the UE can increase the threshold to X+Y1. For example, Y1 can correspond to a power level difference between signals received at the mid-cell point and signals received at the new location after the UE moves closer to the base station. However, if the UE moves farther away from the base station, the UE can decrease the threshold to X−Y2. This is because the received signals at the UE are expected to be weaker and Y2 can correspond to a power level difference between signals received at the mid-cell point and signals received at the new location after the UE moves farther from the base station.

Third, the UE can determine whether to turn on or turn off the main radio by decoding the LP-WUS. In some aspects, the LP-WUS can include a payload that can be decoded by the UE. As discussed above, the payload can include the cell ID and/or the UE ID of the UE. The payload can also include an indication of powering off or powering on the main radio. In some aspects, the payload can also include indications to turn on or turn off the LP-WUR.

Fourth, as further discussed below, the LP-WUS can indicate turning on the main radio and the UE turns off the main radio after a timer expires. In such a case, the LP-WUS does not indicate turning off or turning down the main radio.

In some aspects, the UE is configured by the base station as which approach to use for determining whether to turn off or turn on the main radio. For example, the RRC message received by the UE can indicate the approach selected. Using any of the first three approaches, if the UE determines to turn off or turn down the main radio, the control moves to 308.

At 308, the UE turns off or turns down the main radio to reduce power consumption. For example, the UE refrains from transmitting to or receiving from the base station. If the UE was already in a power-saving mode and the main radio was turned off or down prior to the step 308, the UE stay in the power-saving mode.

Referring back to 306, if the UE determines to turn on the main radio, the control moves to 310.

At 310, the UE turns on the main radio. If the main radio is already turned on prior to the step 310, the UE keeps the main radio on. The UE can receive paging signals from the base station when the main radio is turned on. The UE can also perform data transmission to and from the base station when the main radio is turned on. In some aspects, the UE turns on the main radio based on the LP-WUS described in the fourth approach in 306, the UE starts a timer after receiving the LP-WUS. The main radio stays on until the timer expires. If the timer is already running when the UE receives the LP-WUS, the UE resets the timer.

In some aspects, UE can turn on the main radio if the UE has not received any LP-WUS for a max period of time. For example, the UE may have moved outside a range of the cell the UE camps on or connects to. In such a case, the UE can turn on the main radio to connect the UE to a new cell. The max period of time prevents the UE from staying in the power saving mode for an extended period of time due to a connection lost. In some aspects, if the UE receives the LP-WUS with a power level lower than a min power threshold, the LP-WUS can be considered as not being received. The min power threshold can correspond to a sensitivity of the LP-WUR.

At 312, the UE receives signals using the main radio. As discussed above, the UE can receive paging signals using the main radio. The UE can also perform data transmissions to and from the base station. If the UE is in the RRC inactive mode, the UE can also perform early measurements of neighboring cells using the main radio.

At 314, the UE determines whether the timer is still running. If the timer is still running, the control moves to 310 and the main radio stays on. Otherwise, the control moves to 308 and the main radio is turned off.

In some aspects, the UE does not start or check the timer if the UE determines whether to turn off or turn on the main radio using the first three approaches discussed in 306. Therefore, after turning on, the main radio stays turned on until the UE receives an LP-WUS indicating turning off the main radio. In such a case, the UE determines whether an LP-WUS indicating turning off the main radio is received at 314 instead.

Figure 4:
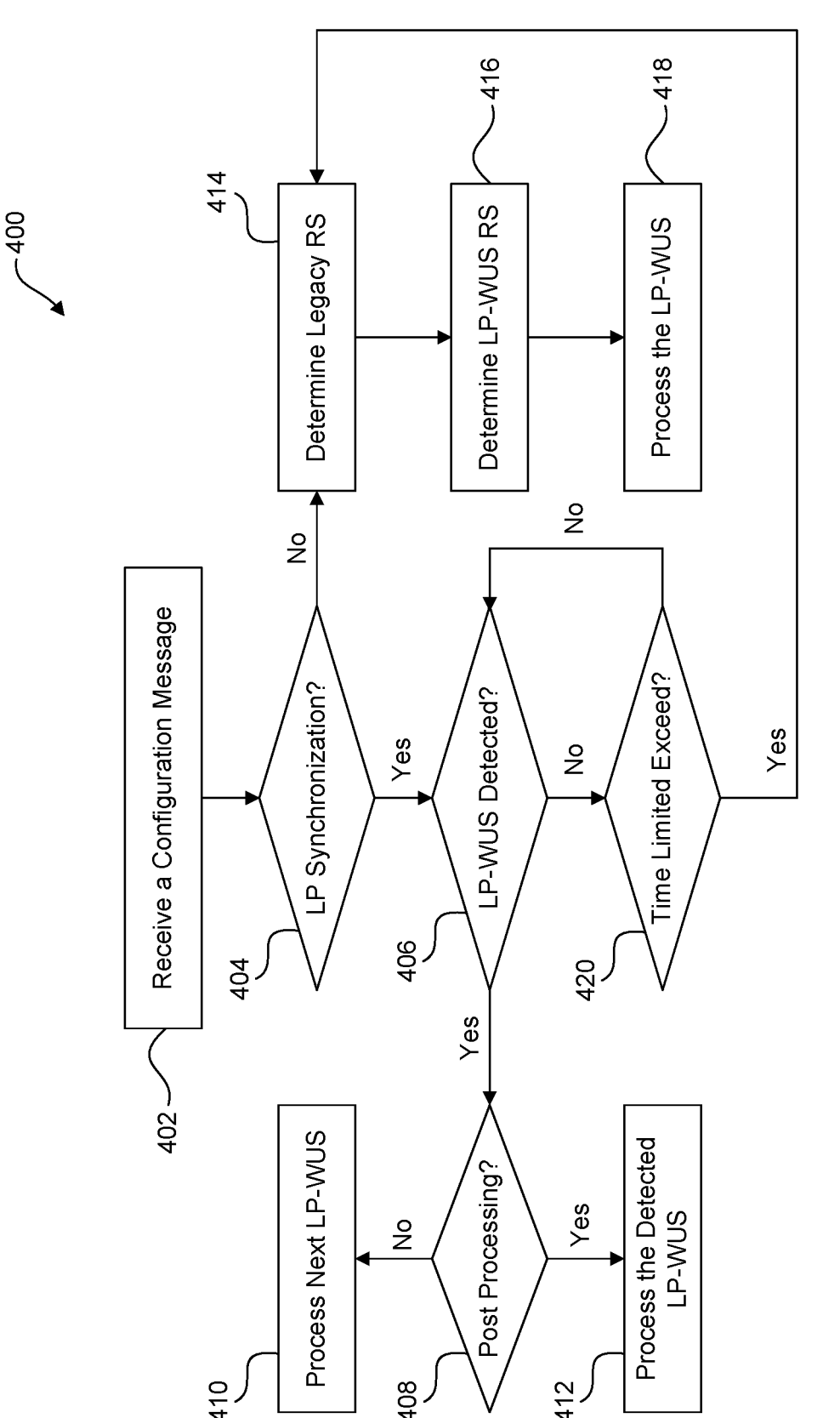
FIG. 4 illustrates an example method of detecting a low power wake up signal (LP-WUS), according to aspects of the disclosure.

FIG. 4 illustrates an example method 400 of detecting the LP-WUS. The example method 400 provides detailed descriptions of step 302 of FIG. 3. For example, the UE needs to know a combination of a frequency band/frequency point and a time location to receive the LP-WUS. The example method 400 describes how the UE determines one or more such combinations (or one or more REs) to receive one or more LP-WUSs. The example method 400 is provided for the purpose of illustration only and does not limit the disclosed aspects. As a convenience and not a limitation, FIG. 4 may be described with regard to elements of FIGS. 1, 2, and 6. The example method 400 may represent the operation of electronic devices (for example, the UE 102 and the base station 104 of FIG. 1) implementing the LP-WUS detection. The example method 400 may also be performed by the electronic device 200 of FIG. 2, controlled or implemented by processor 210, and/or computer system 600 of FIG. 6. But the example method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the UE receives a configuration message from the base station. The UE can determine frequency bands/frequency points and time locations of the LP-WUS based on the configuration message. In some aspects, the UE can receive the configuration message via a higher layer signaling and the configuration message can be included in an RRC message. The UE can receive the configuration message using the main radio when it is turned on. In some aspects, the UE may have received the configuration message previously or the configuration message was hard-coded in the UE. In such a case, the UE can retrieve the configuration message from a memory of the UE and the main radio of the UE can be off at 402.

At 404, the UE can determine whether to perform LP synchronization. For example, the UE needs to synchronize with the base station in time and in frequency to receive the LP-WUS correctly. In some aspects, the UE can use the LP-WUR to synchronize the reception of the LP-WUS, which can be referred to as LP synchronization. Alternatively, the UE can use the legacy RSs received via the main radio to synchronize the reception of the LP-WUS. The configuration message can include an indication of the LP synchronization or legacy RS synchronization. If the configuration message indicates the LP synchronization, the control moves to 406.

At 406, the UE determines whether an LP-WUS is detected. In order to detect the LP-WUS, the UE first determines a frequency band/frequency point and a time location of the LP-WUS. The UE can be assigned the frequency band/frequency point for receiving the LP-WUS by the base station via the configuration message or other messages. As discussed above, the assigned frequency band/frequency point can be cell-specific and/or UE-specific. The assigned frequency/frequency point band can be different from or the same as frequency bands/frequency points assigned to legacy RSs. For example, the assigned frequency band/frequency point can be the same as the frequency bands/frequency points for the SSB transmission. In such a case, interference between the legacy RSs and the LP-WUS is expected, but this design is more frequency efficient. For another example, the assigned frequency band/frequency point can be different from the legacy RSs frequency bands/frequency points. In any case, the UE can determine the frequency band/frequency point based on the configuration message or other messages and tune the LP-WUR to that frequency band/frequency point to receive the LP-WUS.

After tuning to the frequency band/frequency point, the UE determines the time location of the LP-WUS. In some aspects, the base station transmits the LP-WUS periodically. The periodicity of the LP-WUS can be larger than that of the legacy RS. For example, the periodicity of the LP-WUS can be the same as or larger than a discontinuous reception (DRX) cycle, an extended discontinuous reception (eDRX)

cycle, or a paging occasion (PO) cycle. The periodicity of the LP-WUS can be configured by the base station or hard-coded in the UE. In some aspects, the base station can indicate to the UE a receiving window to transmit the LP-WUS. For example, the base station can indicate a 2 ms receiving window in every cycle of the periodical transmission of the LP-WUS. Therefore, the UE expects to receive the LP-WUS in the receiving window, but does not know when exactly the LP-WUS is to be received in the receiving window. In some aspects, the UE detects the LP-WUS in the receiving window by calculating correlation values between one or more local sequences and segments of the receive signals in a sliding window style. As discussed above, the UE can generate one or more local sequences that may match the LP-WUS. If a segment of the received signal within the receiving window includes the LP-WUS, the correlation value between at least one of the one or more local sequences and the segment of the received signal should be higher than a threshold value. In such a case, the UE determines that the LP-WUS is detected as the segment and the control moves to 408.

At 408, the UE determines whether to perform a post processing method regarding the detected LP-WUS. In the post processing method, the UE stores the segment of the received signal in a memory of the UE before calculating correlation values between the one or more local sequences and the segment. If the UE determines that the segment of the received signal includes the LP-WUS, the UE retrieves the segment from the memory of the UE and processes the segment as a detected LP-WUS. Alternatively, if the UE determines that the segment stored in the memory of the UE does not include the LP-WUS, the UE discards the segment. The post processing method enables the UE to process the detected LP-WUS in real-time, but requires storage spaces in the memory of the UE.

In some aspects, the configuration message can indicate whether to perform the post processing method. In other aspects, the UE can make the determination by itself. For example, the UE can determine to perform the post processing method if the UE moves at high speed. For another example, the UE can determine to not perform the post processing as discussed below in 410 if the UE is low on memory storage space. If the UE determines to perform the post processing, the control moves to 412.

At 412, the UE processes the LP-WUS detected in 406. In some aspects, the UE can retrieve the segment from the memory of the UE and process the segment as a detected LP-WUS. For example, the UE can process the segment as described in steps of FIG. 3.

Referring back to 408, if the UE determines not to perform the post processing method, the control moves to 410. At 410, the UE marks a time location in the receiving window of the detected LP-WUS in 406. For example, the receiving window can be a 2 ms period and the LP-WUS is detected at 0.5 ms point within the 2 ms period. The UE then can mark the 0.5 ms point. In the next receive window, the UE can receive an LP-WUS at the 0.5 ms point. In other words, the UE assumes that LP-WUSs can be received in a same position of a receiving window for each of other receiving windows. In some aspects, the UE can calculate a correlation value between the LP-WUS and a segment of the received signal starting at 0.5 ms of the receiving window. Because the UE has detected an LP-WUS previously at 0.5 ms, it is likely that the correlation value is greater than the threshold value. In other aspects, the UE determines that the segment of the received signal starting at 0.5 ms of the receiving window to be a detect LP-WUS without calculating a correlation value.

Referring back to 406, if the UE determines that no LP-WUS is detected in the receiving window, the control moves to 420. In some aspects, the no detection condition can be due to low received signal strength or quality. For example, the UE can move away from the base station or the UE can experience interference signals.

At 420, the UE determines a no detection period that is between a current time and a time of the last LP-WUS detection. If the no detection period is smaller than a time threshold, the control moves back to 406 and the UE attempt to detect an LP-WUS in a next receiving window. Otherwise, the control moves to 414 and the UE detects the LP-WUS based on legacy RSs.

In some aspects, the time threshold can be the same as the max period of time discussed in 310 of FIG. 3. As discussed above, the UE can turn on the main radio if no LP-WUS is detected for the max period of time. Similarly here, when the time threshold is met, the UE can use the legacy RSs to detect the LP-WUS and the UE needs to turn on the main radio to receive the legacy RSs. In some aspects, the time threshold and/or the max period of time are configured to differentiate a temporary no detection condition and a permanent no detection condition. For example, the UE may fail to detect the LP-WUS in a receiving window due to an interference signal transmitted by another device nearby. The other device may move away or stop transmitting in a next receiving window and thus the UE can detect the LP-WUS in the next receiving window. In such a case, the no detection period does not exceed the time threshold or the max period of time and thus is a temporary no detection condition. For another example, the UE may move outside a range of the base station supporting the cell that the UE camps on or connects to. In such a case, signals from the base station may become too weak to be detected by the UE. If the UE stays outside the range of the base station for a long period of time, such as more than the max period of time, the UE is in the permanent no detection condition. In such a case, the UE seeks alternative solutions, such as turning on the main radio as described in 310 of FIG. 3 above or the moving to step 414 as described below.

Referring back to 404, if the UE determines, based on the configuration message, not to perform the LP synchronization, the control moves to 414 to perform legacy RS synchronization. In some aspects, the UE performs the legacy RS synchronization to determine the frequency band/frequency point and the time location of the LP-WUS based on a legacy RS.

At 414, the UE determines the legacy RS to be used. The configuration message can indicate the legacy RS. As discussed above, the legacy RS can be any one of the SSB signals, the PSS, the SSS, the PBCH signals, the DMRS, or SI signals. The UE then determines a frequency band/frequency point and a time location of the legacy RS. The frequency band/frequency point and the time location of the legacy RS can form a first set of REs of the legacy RS.

At 416, the UE can determine the frequency band/frequency point and the time location of the LP-WUS based on the legacy RS. In some aspects, the legacy RS can be quasi co located (QCLed) with the LP-WUS. For example, as discussed above, the legacy RS can be received in the first set of REs. The LP-WUS can be received in a second set of REs. The first set and the second set can have a frequency offset and/or a time offset. The UE can determine the frequency offset and/or the time offset based on the configuration message received from the base station. Since UE determines the first set of REs of the legacy RS in 414, the UE can determine the second set of REs of the LP-WUS based on the first set and the frequency/time offset. With the second set of REs, the UE can determine the frequency band/frequency point and the time location of the LP-WUS and detect the LP-WUS. In some aspects, the UE can also determine a receiving beam to receive the LP-WUS based on the legacy RS. For example, the receiving beam of the LP-WUS and a receiving beam to receive the legacy RS can be QCLed. The UE can determine a QLCed beam relationship between the (first) receiving beam of the legacy RS and the second receiving beam of the LP-WUS based on the configuration message received at 402. For example, the QLCed beam relationship can be a type D beam relationship. The UE can also determine the (first) receiving beam of the legacy RS at 414 and thus determine the (second) receiving beam of the LP-WUS based on the receiving beam of the legacy RS and the QLCed beam relationship at 416.

At 418, the UE process the LP-WUS detected in 416 in a similar way as described in 412.

In some aspects, the UE can repeat steps 414, 416, and 418 for each cycle of the periodical transmissions of the LP-WUS. For example, the LP-WUS can be transmitted and received with the DRX cycle. The UE can perform the steps 414, 416, and 418 in each DRX cycle.

Figure 5:
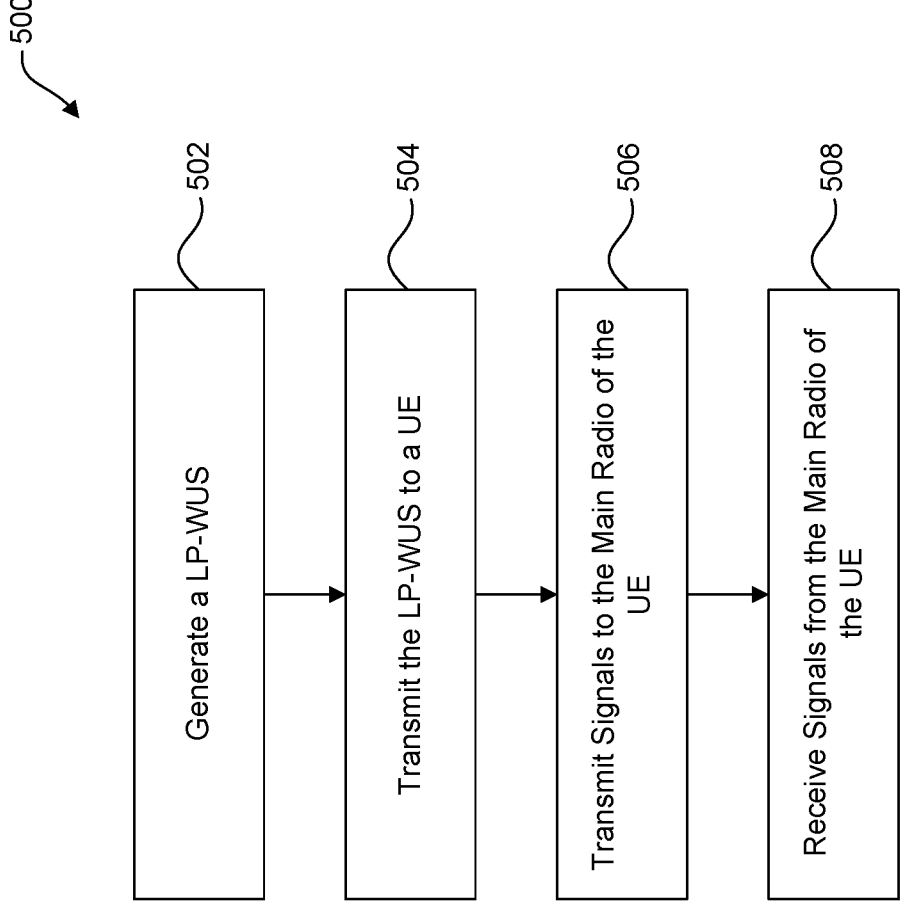
FIG. 5 illustrates an example method of generating and transmitting the LP-WUS, according to aspects of the disclosure.
Figure 6:
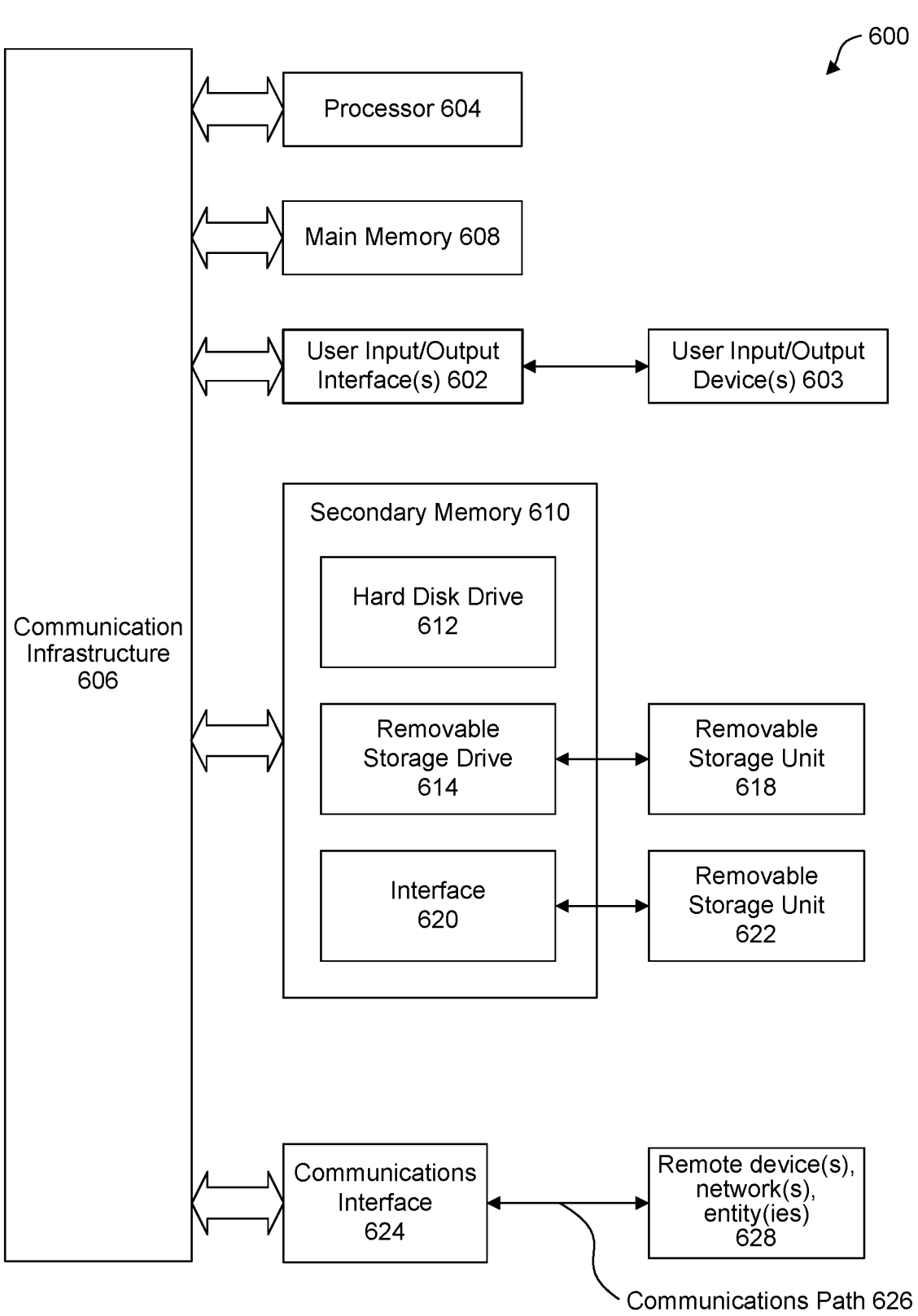
FIG. 6 is an example computer system for implementing some aspects of the disclosure or portion(s) thereof.

FIG. 5 illustrates an example method 500 of generating and transmitting the LP-WUS. The example method 500 is provided for the purpose of illustration only and does not limit the disclosed aspects. As a convenience and not a limitation, FIG. 5 may be described with regard to elements of FIGS. 1, 2, and 6. The example method 500 may represent the operation of electronic devices (for example, the UE 102 and the base station 104 of FIG. 1) implementing the LP-WUR. The example method 500 may also be performed by the electronic device 200 of FIG. 2, controlled or implemented by processor 210, and/or computer system 600 of FIG. 6. But the example method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5.

At 502, a base station, such as the base station 104, generates a LP-WUS. In some aspects, the LP-WUS can indicate a cell of a UE, such as the cell 110 of the UE 102. Similar to the description of 304 of FIG. 3 above, the LP-WUS can indicate the cell in three approaches. First, the base station can generate the LP-WUS by scrambling a cell ID of the cell with a scrambling sequence. In other words, the base station indicates the cell that the LP-WUS is directed to by scrambling the cell ID of that cell into the LP-WUS using the scrambling sequence. The scrambling sequence is known by both the base station and the UE. For example, the scrambling sequence can be transmitted to the UE from the base station beforehand. Second, a frequency band/frequency point of the LP-WUS can be cell-specific. For example, the base station can assign frequency bands/frequency points to different cells. The base station can indicate the cell by transmitting the LP-WUS in the frequency band/frequency point assigned to the cell. Third, the LP-WUS can include a payload that includes a cell ID. The base station can encode the cell ID of the cell into the payload. In some aspects, the cell ID of the UE can also include a PCI of the UE.

In some aspects, the LP-WUS can also indicate a UE, such as the UE 102. Similar to the description of 304 of FIG.

3 above, the LP-WUS can indicate the UE in three approaches. First, the base station can generate the LP-WUS by scrambling a UE ID of the UE with the scrambling sequence. In some aspects, the base station can generate the LP-WUS by scrambling both the UE ID and the cell ID with the scrambling sequence. Second, the frequency band/frequency point of the LP-WUS can be UE-specific. For example, each UE can be assigned a frequency band/frequency point. Therefore, the base station can indicate the UE by transmitting the LP-WUS in the frequency band/frequency point assigned to the UE. Third, the LP-WUS can include the payload that includes the UE ID. The base station can encode the UE ID into the payload.

In some aspects, the LP-WUS can indicate turning on a main radio of a UE, such as the main radio 220. The LP-WUS can also indicate turning off/down the main radio of the UE. The base station indicate using the LP-WUS via at least four approaches.

First, the base station can generate the LP-WUS using one of two scrambling sequences: "ON" sequence and "OFF" sequence. If the base station would like to turn on the main radio of the UE, the base station can generate the LP-WUS using the "ON" sequence. For example, the base station can generate the LP-WUS by scrambling the "ON" sequence with the cell ID and/or the UE ID of the UE. Otherwise, the base station can generate the LP-WUS using the "OFF" sequence. For example, the base station can generate the LP-WUS by scrambling the "OFF" sequence with the cell ID and/or the UE ID of the UE.

Second, the base station can indicate using a power level of the LP-WUS. In some aspects, if the base station would like to turn off or turn down the main radio of the UE, the base station transmits the LP-WUS at a power level that is higher than a power threshold. Otherwise, the base station transmits the LP-WUS at a power level that is lower than the power threshold. In other aspects, if the base station would like to turn off or turn down the main radio of the UE, the base station transmits the LP-WUS at a power level that is lower than a power threshold. Otherwise, the base station transmits the LP-WUS at a power level that is higher than the power threshold.

Third, the base station can encode an indication of turning on or turning off the main radio of the UE into the LP-WUS. For example, the payload of the LP-WUS can include the indication of turning on or turning off the main radio. In some aspects, the payload can also include indications to turn on or turn off the LP-WUR of the UE.

Fourth, as discussed above, the LP-WUS can indicate turning on the main radio and the UE turns off the main radio after a timer expires. In such a case, the LP-WUS does not indicate turning off or turning down the main radio.

At 504, the base station transmits the LP-WUS to the UE. In some aspects, the base station transmits the LP-WUS in a frequency band/frequency point assigned to the LP-WUS. The frequency band/frequency point can be UE-specific and/or cell-specific as discussed above. The base station can also transmit the LP-WUS periodically and within a receiving window in each cycle, as discussed in FIG. 4 above.

In some aspects, the base station also transmits a configuration message to the UE. The base station can transmit the configuration message before transmitting the LP-WUS or at the same time as transmitting the LP-WUS. The configuration message can be received by the main radio of the UE. The configuration message can indicate to the UE which approach to use to determine the cell indicated by the LP-WUS, the UE indicated by the LP-WUS, and/or whether to turn off or turn on the main radio of the UE. The configuration message can also be the configuration message discussed in 402 of FIG. 4.

At 506, the base station transmits signals to the main radio of the UE. For example, the base station can transmit paging messages to the main radio of the UE to configure the UE to enter the RRC connected mode. The base station can also transmit other data to the UE, such as data of small data communications when the UE is in the RRC inactive mode.

At 508, the base station receives signals from the UE. In some aspects, the UE may receive the paging messages from the base station in 506 and enter the RRC connected mode. The UE may report results of the early measurements to the base station to reconfigure a primary cell and/or one or more secondary cells of the UE.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a low power wake up radio (LP-WUR) and a main radio configured to enable wireless communications with a base station; and
a processor, communicatively coupled to the LP-WUR and the main radio, and configured to:
receive, using the main radio, a legacy reference signal at a first frequency point;
receive, using the LP-WUR, a first low power wake up signal (LP-WUS) from the base station at the first frequency point with a periodicity, wherein the periodicity is:
greater than or equal to a discontinuous reception (DRX) cycle,
greater than or equal to an extended discontinuous reception (eDRX) cycle, or
greater than or equal to a paging occasion (PO) cycle;
determine that the first LP-WUS corresponds to a cell of the UE;
determine that the first LP-WUS indicates powering on the main radio;
turn on the main radio; and
receive, using the main radio, a paging message from the base station.

2. The UE of claim 1, wherein the processor is further configured to:
receive, using the main radio, a second legacy reference signal at a first second frequency point,
wherein the first LP-WUS is received at the first frequency point.

3. The UE of claim 1, wherein to determine that the first LP-WUS corresponds to the cell of the UE, the processor is further configured to:

determine that the first LP-WUS correlates to a first local sequence, wherein the first local sequence is generated using a physical cell identification (PCI) number of the cell.

4. The UE of claim 3, wherein the first local sequence is also generated using a UE ID number.

5. The UE of claim 1, wherein to determine that the first LP-WUS indicates powering on the main radio, the processor is further configured to determine that the first LP-WUS correlates to a first local sequence.

6. The UE of claim 5, wherein the processor is further configured to:

receive, using the LP-WUR, a second LP-WUS from the base station;

determine that the second LP-WUS correlates to a second local sequence; and turn the main radio off responsive to the second LP-WUS.

7. The UE of claim 1, wherein the processor is further configured to:

in response to turning on the main radio, start a timer;

determine that the timer expires; and in response to the timer expiration, turn off the main radio.

8. The UE of claim 1, wherein to determine that the first LP-WUS indicates powering on the main radio, the processor is further configured to determine that a power level of the first LP-WUS is higher than a power threshold.

9. The UE of claim 1, wherein to receive the first LP-WUS, the processor is further configured to:

calculate correlation values between received signals and a local sequence;

determine that a correlation value between a segment of the received signals and the local sequence is higher than a correlation threshold; and determine that the segment of the received signals includes the first LP-WUS.

10. The UE of claim 1, wherein to receive the first LP-WUS, the processor is further configured to:

determine a first resource element (RE) of a second legacy reference signal;

determine an offset value;

determine a second RE of the first LP-WUS based on the first RE and the offset value; and receive the first LP-WUS in the second RE.

11. The UE of claim 10, wherein the processor is further configured to:

receive, using the main radio, a configuration message from the base station, wherein the configuration message indicates the second legacy reference signal and the offset value.

12. The UE of claim 1, wherein to receive the first LP-WUS, the processor is further configured to:

determine a first receiving beam to receive a second legacy reference signal;

determine a quasi co located (QCLed) type D beam relationship between the first receiving beam and a second receiving beam to receive the first LP-WUS;

determine the second receiving beam based on the first receiving beam and the QCLed type D beam relationship; and receive the first LP-WUS with the second receiving beam.

13. A method of a user equipment (UE) comprising:

receiving, using a main radio of the UE, a legacy reference signal at a first frequency point;

receiving, using a low power wake up radio (LP-WUR) of the UE, a first low power wake up signal (LP-WUS) from a base station at the first frequency point with a periodicity, wherein the periodicity is:

greater than or equal to a discontinuous reception (DRX) cycle, greater than or equal to an extended discontinuous reception (eDRX) cycle, or greater than or equal to a paging occasion (PO) cycle;

determining that the first LP-WUS corresponds to a cell of the UE;

determining that the first LP-WUS indicates powering on a main radio of the UE;

turning on the main radio; and receiving, using the main radio, a paging message from the base station.

14. The method of claim 13, wherein the determining that the first LP-WUS corresponds to a cell of the UE further comprises:

determining that the LP-WUS correlates to a first local sequence, wherein the first local sequence is generated using a physical cell identification (PCI) number of the cell.

15. The method of claim 13, further comprising:

in response to turning on the main radio, starting a timer;

determining that the timer expires; and in response to the timer expiration, turning off the main radio.

16. The method of claim 13, wherein the determining that the first LP-WUS indicates powering on the main radio of the UE further comprises determining that a power level of the first LP-WUS is higher than a power threshold.

17. The method of claim 13, wherein the receiving the first LP-WUS from the base station further comprises:

calculating correlation values between received signals and a local sequence;

determining that a correlation value between a segment of the received signals and the local sequence is higher than a correlation threshold; and determining that the segment of the received signals includes the first LP-WUS.

18. A non-transitory computer-readable medium (CRM) comprising instructions to, upon execution of the instructions by one or more processors of a user equipment (UE), cause the UE to perform operations, the operations comprising:

receiving, using a main radio of the UE, a legacy reference signal at a first frequency point;

receiving, using a low power wake up radio (LP-WUR) of the UE, a first low power wake up signal (LP-WUS) from a base station at the first frequency point with a periodicity, wherein the periodicity is:

greater than or equal to a discontinuous reception (DRX) cycle, greater than or equal to an extended discontinuous reception (eDRX) cycle, or greater than or equal to a paging occasion (PO) cycle;;

determining that the first LP-WUS corresponds to a cell of the UE;

determining that the first LP-WUS indicates powering on a main radio of the UE;

turning on the main radio; and receiving, using the main radio, a paging message from the base station.

19. The non-transitory CRM of claim 18, wherein the determining that the first LP-WUS corresponds to a cell of the UE further comprises:

determining that the first LP-WUS correlates to a first local sequence, wherein the first local sequence is generated using a physical cell identification (PCI) number of the cell.

\* \* \* \* \*